United States Patent [19]

Creydt et al.

[11] Patent Number: 4,679,681
[45] Date of Patent: Jul. 14, 1987

[54] SYNCHRONIZING RING AND PROCESS OF MANUFACTURING THE SAME

[75] Inventors: Martin Creydt, Wiesloch; Wolfgang Bickle, Reilingen; Harald Pfestorf, Untereisesheim, all of Fed. Rep. of Germany

[73] Assignee: Kolbenschmidt AG, Neckarsulm, Fed. Rep. of Germany

[21] Appl. No.: 717,633

[22] Filed: Mar. 29, 1985

[30] Foreign Application Priority Data

May 4, 1984 [DE] Fed. Rep. of Germany ....... 3412779

[51] Int. Cl.⁴ ................... F16D 23/02; F16D 13/66
[52] U.S. Cl. .................... 192/107 M; 192/53 E; 192/53 F
[58] Field of Search ............. 192/53 F, 107 M, 53 E; 106/36

[56] References Cited

U.S. PATENT DOCUMENTS

| 2,354,526 | 7/1944 | Lapsley et al. | 192/53 E X |
| 3,347,347 | 10/1967 | Hetmann | 192/107 M X |
| 3,365,039 | 1/1968 | Stott et al. | 192/107 M X |
| 3,744,604 | 7/1973 | Austen | 192/107 M X |
| 4,018,319 | 4/1977 | Thomas | 192/53 E |
| 4,049,090 | 9/1977 | Buell | 192/107 M X |
| 4,091,904 | 5/1978 | Beyer | 192/107 M |
| 4,267,912 | 5/1981 | Bauer et al. | 192/53 F |
| 4,314,627 | 2/1982 | Nozawa | 192/53 F |
| 4,505,963 | 3/1985 | Ogiwara | 106/36 X |

FOREIGN PATENT DOCUMENTS

| 2055345 | 5/1972 | Fed. Rep. of Germany | 192/107 M |
| 2430708 | 1/1976 | Fed. Rep. of Germany | 192/53 F |
| 2430920 | 1/1976 | Fed. Rep. of Germany | 192/53 F |
| 195923 | 12/1982 | Japan | 192/107 M |
| 190517 | 10/1984 | Japan | 192/53 E |
| 945445 | 1/1964 | United Kingdom | 192/53 F |

Primary Examiner—Rodney H. Bonck
Assistant Examiner—Richard M. Lorence
Attorney, Agent, or Firm—Sprung Horn Kramer & Woods

[57] ABSTRACT

A synchronizing ring is composed of a composite material comprising a metallic layer consisting of aluminum alloy and having a thickness of 0.1 to 1.0 mm forming a friction cone and a steel backing layer having a thickness of 0.5 to 3.5 mm and cladded to the metallic layer. The invention also includes a process of manufacturing a synchronizing ring by metal forming.

2 Claims, 6 Drawing Figures

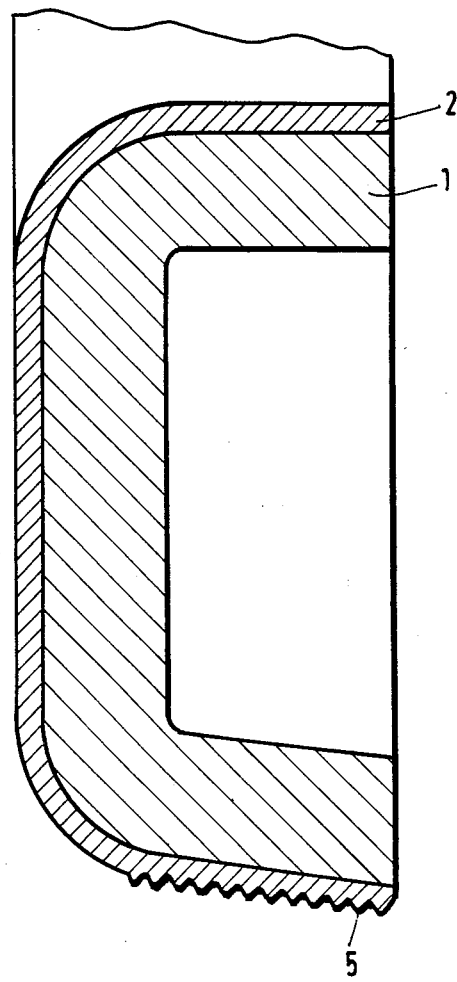

SYNCHRONIZING RING AND PROCESS OF MANUFACTURING THE SAME

This invention relates to a synchronizing ring consisting of a composite material and to a process of manufacturing the ring.

Special brasses of type CuZn40A12 in accordance with DIN 17660 have proved satisfactory for a long time as a material for single-metal synchronizing rings because said materials distinguish by a good combination of coefficient of friction, wear resistance and mechanical strength. Synchronizing rings for higher mechanical stresses are made of special brasses which contain manganese, aluminum, iron, silicon, nickel, tin and/or lead (German Patent Publication No. 11 54 643; German Patent Publication No. 12 05 285; ATZ Automobil-Technische Zeitschrift 83, 5 (1981), pages 1 to 4, Frankh'sche Verlagshandlung, Stuttgart). These synchronizing rings for higher mechanical stresses have the required wear resistance because they are plated with molybdenum. In addition to synchronizing rings made of special brass, cast or forged synchronizing rings made of silicon-manganese-bronze and phosphor-bronze have been used for special application. Synchronizing rings made of steel or iron must also be provided with a sprayed coating of molybdenum or carbon-manganese steel. Other known synchronizing rings are derived from an aluminum alloy of type AlSil2 and have been used for relatively lightly loaded, manually shifted transmissions for small motor vehicles.

The uncoated synchronizing ring made of CuZn-40A11 still meets all requirements to be fulfilled by synchronizing rings as far as its use and manufacture is concerned. But there are numerous materials by which individual requirements are met much more satisfactorily than by the known special brasses. For this reason there has been no lack of proposals to use, inter alia, also composite materials in the manufacture of synchronizing rings. For instance, German Patent Publication No. 16 52 862 discloses a synchronizing ring in which an inner ring made of soft steel and provided on the friction cone side is mechanically joined to an outer ring made of a bronze alloy. The inner ring may also be made of plastic, if desired.

In view of requirements of environmental protection and a saving of energy, it is presently desired to increase the energy efficiency of internal combustion engines and to reduce their weight. But the higher power involves higher torques and higher speeds so that higher synchronizing forces and higher sliding speeds are developed in the manually shifted transmissions. Because the weight of the motor vehicles and the volume of the manually shifted transmission are reduced too, the specific load on such transmissions and also the specific load on the synchronizing rings will be increased.

A synchronizing ring should have a life which corresponds to the life of the internal combustion engine and to the life of the motor vehicle and should be highly reliable. For this purpose the synchronizing ring is required to have properties which are constant for a long time, particularly as regards coefficient of friction, wear resistance and mechanical strength. Besides, the synchronizing ring should be made of low-cost materials and its manufacture should not involve a high expenditure.

SUMMARY OF THE INVENTION

This object is accomplished in accordance with the invention in that the metallic layer which constitutes the friction cone is cladded to a backing layer, which is made of a different material.

The metallic layer constituting the friction cone consists of an aluminum alloy of the type Al Si 12 Cu Mg Ni, Al Si 18 Cu Ni Mg or Al Zn 4.5 Si Cu Pb and is bonded to a backing layer of steel.

In accordance with a preferred feature of the invention the friction layer has a thickness of 0.1 to 1.0 mm and the backing layer has a thickness of 0.5 to 3.5 mm.

The manufacture of such composite material has been described in Patent ... (German Patent Application No. P 33 27 657.9). A strip which has a thickness of 0.5 to 5 mm and consists of a precipitation-hardenable aluminum alloy that has been homogenized at temperatures from 450° to 550° C. for 0.5 to 3 hours and has subsequently been quenched and a steel strip having a thickness of 0.5 to 10 mm are bonded by roll cladding at a speed of 1.5 to 5 meters per minute and at a cladding temperature of 200° to 450° C. and the composite material is quenched as soon as it leaves the roll nip.

Alternatively, the aluminum alloy may be cast on the steel strip.

Circular blanks are blanked from the composite material and are used to make the synchronizing rings by metal forming. At the same time, the axial recesses for draining oil and the thread grooves on the friction cones, the guiding elements for the sliding members and an inner synchronizing ring the gear ring are formed by metal forming. The recesses for draining oil are so shaped that they serve also to stiffen the backing layer.

The synchronizing rings designed in accordance with the invention are shown by way of example in the drawings, which will be explained more in detail hereinafter.

BRIEF DESCRIPTION OF THE DRAWINGS

FIG. 3 is an enlarged detail of the section I—I of FIG. 1.

DETAILED DESCRIPTION OF THE INVENTION

Figure 2:
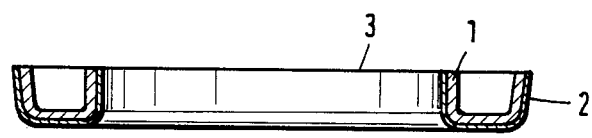
FiG. 2 is a transverse sectional view along line I—I in FIG. 1.
Figure 1:
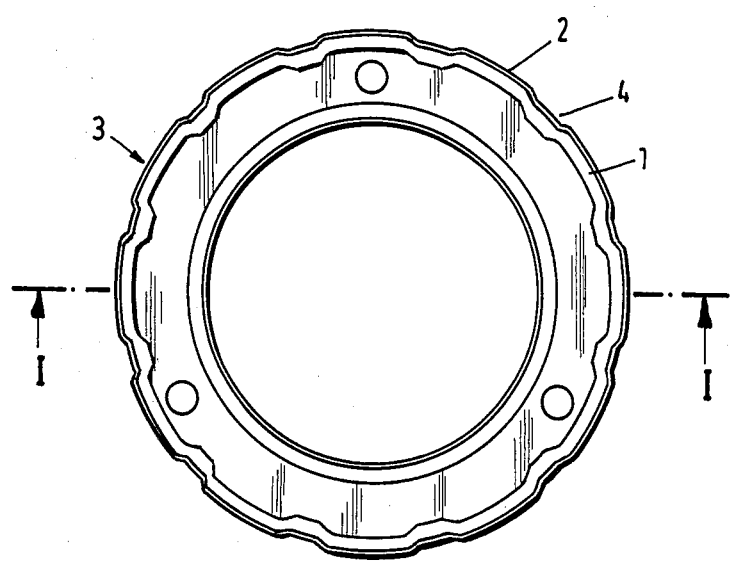
FIG. 1 is a top plan view of the ring according to the invention.

FIG. 1 is a top plan view showing an outer synchronizing ring 3 made by deepdrawing from a blank, which has been blanked from a composite material that has been made in that a steel strip 1 and a strip 2 of an aluminum alloy of type AlSi12CuNiMg have been bonded by roll-cladding. Aluminum alloy layer constitutes the friction cone and is formed with axial oil drain passages 4, which have been formed by metal forming. FIG. 2 is a transverse sectional view taken on section line I—I in FIG. 1.

FIG. 3 is an enlarged sectional view on one portion of the section line I—I in FIG. 1 and illustrates the radial thread grooves 5 of the friction cone. Said thread grooves have been formed by metal forming.

Figure 4:
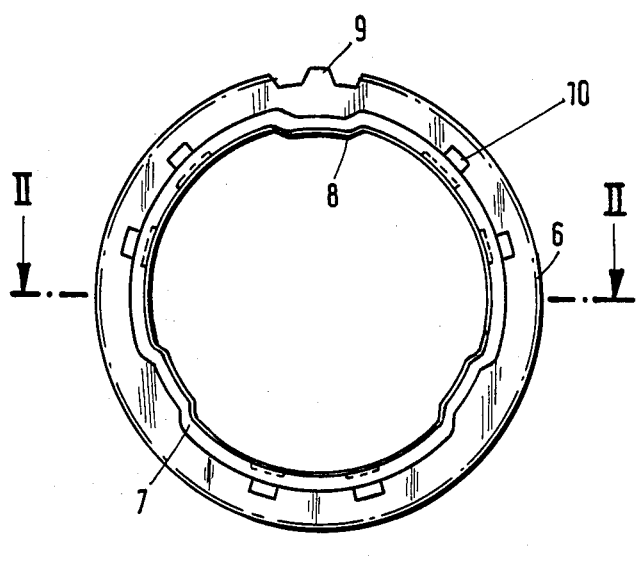
FIG. 4 is a top plan view of a ring according to the invention.
Figure 5:
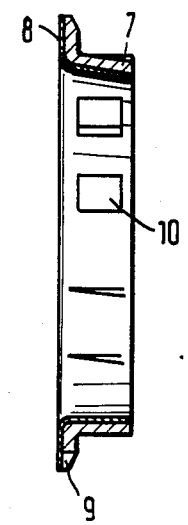
FIG. 5 is a sectional view taken along line II—II of FIG. 4.
Figure 6:
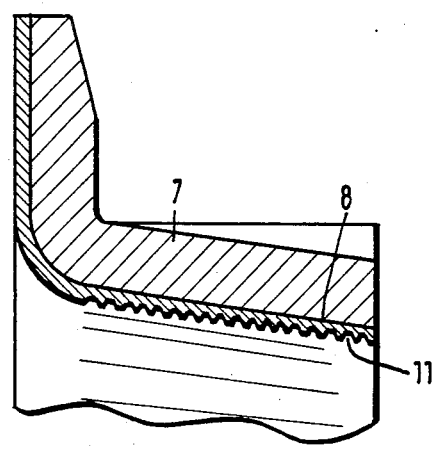
FIG. 6 is an enlarged sectional view on a portion of the section line II—II in FIG. 4.

FIG. 4 is a top plan view showing an inner synchronizing ring 6, which has been made by embossing from a circular blank blanked from a composite material that has been made by roll cladding and consists of a steel layer 7 and a layer 8 of an aluminum alloy of type AlSi18CuNiMg. FIG. 5 is a sectional view taken on section line II—II in FIG. 4. The gear ring 9 and the elements 10 for guiding the sliding members have been made by metal forming. FIG. 6 is an enlarged sectional view on a portion of the section line II—II in FIG. 4 and shows the thread grooves 11 formed in the aluminum alloy layer 8.

The advantages afforded by the invention reside particularly in the combination of the excellent properties of the aluminum alloy as regards friction and wear resistance and the high mechanical strength properties of the backing layer.

What we claim is:

1. A synchronizing ring comprising a metal formed blank composed of a composite material, comprising a metallic layer consisting of an aluminum alloy of the type selected from the group of Al Si 12 Cu Ni Mg, Al Si 18 Cu Ni Mg and Al Zn 4.5 Si Pb Cu Mg and having a thickness of 0.1 to 1.0 mm forming a friction cone and a steel backing layer having a thickness of 0.5 to 3.5 mm cladded to the metallic layer.

2. A synchronizing ring according to claim 1, wherein said metallic and backing layers consist of sheet metal.

* * * * *